United States Patent Office 3,418,339
Patented Dec. 24, 1968

3,418,339
10,11-EPOXY-10,11-DIHYDRO-5H-DIBENZO[a,d]
CYCLOHEPTENE-5-CARBOXAMIDES
Thomas A. Dobson, St. Laurent, Montreal, Quebec, and
Martin A. Davis, Montreal, Quebec, Canada, assignors
to American Home Products Corporation, New York,
N.Y., a corporation of Delaware
No Drawing. Filed Apr. 4, 1966, Ser. No. 539,656
6 Claims. (Cl. 260—348)

ABSTRACT OF THE DISCLOSURE

There are disclosed herein the new compounds, 10, 11-epoxy - 10,11 - dihydro-5H-dibenzo[a,d]cycloheptene - 5-carboxamide and N-substituted derivatives thereof wherein the substituent on the nitrogen atom is methyl, ethyl, propyl, di-loweralkylaminoethyl or di-loweralkylaminopropyl. The acid addition salts of the basic compounds with oxalic, tartaric and citric acids are also disclosed. The new compounds have trichomonicidal properties and dosage forms thereof are described. A method of preparation starting with 11-bromo-10,5-(epoxymethano)-10,11-dihydro - 5H - dibenzo[a,d]-cyclohepten - 13 - one, which is treated with ammonia or a primary amine, is also disclosed.

---

This invention relates to novel chemical compounds having useful biological properties and to intermediates used in their preparation. In particular this invention relates to N-substituted 10-11-epoxy-10,11-dihydro-5H-dibenzo[a,d]-cycloheptene-5-carboxamide derivatives of the following Formula I:

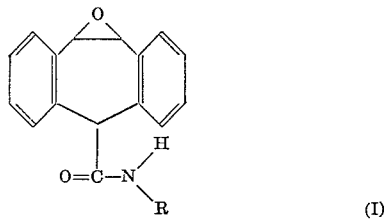

wherein the substituent R may represent hydrogen, a lower alkyl group such as, for example, methyl, ethyl, or propyl or a lower dialkylaminoalkyl group such as, for example, dimethylaminoethyl or diethylaminopropyl.

The compounds of this invention may be prepared by treating 11 - bromo-10,5-(epoxymethano)-10,11-dihydro-5H-dibenzo[a,d]-cyclohepten-13-one of Formula II at a temperature within the range of —40° to 80° C. with either ammonia or a primary amine of the formula RNH₂, wherein R is as previously defined, either in the presence or absence of a solvent such as, for example, water or dioxan, for a period of up to one day to give, after removal of the solvent and crystallization, the corresponding 10,11-epoxy-10,11-dihydro-5H-dibenzo[a,d]cycloheptene-5-carboxamide of Formula I as shown in the following formula:

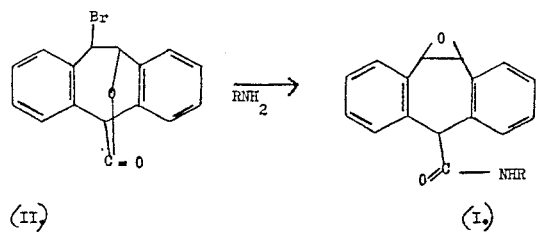

The compounds of generic Formula I wherein R represents dialkylaminoalkyl may optionally be converted to their pharmacologically acceptable acid addition salts with acids such as, for example, oxalic, tartaric, or citric acid.

The compounds of this invention inhibit the growth of *Trichomonas vaginalis* and are useful as trichomonicidal agents. As such, they may be formulated with suitable excipients in the form of vaginal suppositories or inserts containing from 50 to 250 mg. of the active ingredient, to be administered two to three times a day for periods of time of up to fourteen days.

The starting material for the compounds of this invention, 11 - bromo-10,5-(epoxymethano)-10,11-dihydro-5H-dibenzo[a,d]-cyclohepten-13-one may be prepared as described in our co-pending application Ser. No. 539,640 filed Apr. 4, 1966, now Patent No. 3,361,767, issued Jan. 2, 1968. Briefly, this process entails the addition of one molar proportion of bromine to 5H-dibenzo[a,d]cycloheptene-5-carboxamide, which may be prepared as described by M. A. Davis et al., in J. Med. Chem., 7, 88 (1964), dissolved in an inert solvent such as, for example, chloroform to yield 10,11-dibromo-10,11-dihydro-5H-dibenzo[a,d]cycloheptene-5-carboxamide, which upon treatment with either boiling water or a boiling alkanol yields the desired 11-bromo-10,5-(epoxymethano)-10,11-dihydro-5H-dibenzo[a,d]-cyclohepten-13-one of Formula II.

The following examples will be illustrative of this invention. All the compounds described therein are identified by elemental analysis.

EXAMPLE 1

10,11-epoxy-10,11-dihydro-5H-dibenzo[a,d]
cycloheptene-5-carboxamide 11-bromo-10,5-(epoxymethano) - 10,11 - dihydro - 5H-dibenzo[a,d]cyclohepten-13-one (31.5 g.) is added in small portions to liquid ammonia (250 ml.). The mixture is stirred for two hours and the ammonia is then allowed to evaporate. The residue is washed with water and the water insoluble material is crystallized from ethanol to give the title product with M.P. 191–193° C.

EXAMPLE 2

N-methyl-10,11-epoxy-10,11-dihydro-5H-dibenzo[a,d]
cycloheptene-5-carboxamide

11 - bromo - 10,5 - (epoxymethano) - 10,11 - dihydro-5H-dibenzo[a,d]cyclohepten-13-one (31.5 g.) is added in small portions to a 25% solution of methylamine in water (200 ml.). The mixture is stirred overnight at room temperature. The resulting suspension is filtered and the solids are thoroughly washed with water and then crystallized from methanol to yield the title product with M.P. 192–194° C.

EXAMPLE 3

N-(dimethylaminoethyl)-10,11-epoxy-10,11-dihydro-5H-
dibenzo[a,d]cycloheptene-5-carboxamide 11 - bromo - 10,5 - (epoxymethano) - 10,11 - dihydro-5H-dibenzo[a,d]cyclohepten-13-one (5.0 g.) is added in small portions to N,N-dimethylaminoethylamine (10 ml.). The mixture is stirred for 12 hours and then diluted with water. The solids are collected, thoroughly washed with water, dried and crystallized from methanol to give the title compound with M.P. 150–153° C.

EXAMPLE 4

N-(dimethylaminopropyl)-10,11-epoxy-10,11-dihydro-
5H-dibenzo[a,d]cycloheptene-5-carboxamide 11 - bromo - 10,5 - (epoxymethano) - 10,11 - dihydro-5H-dibenzo[a,d]cyclohepten-13-one (5.0 g.) is added in small portions to N,N-dimethylaminopropylamine (10 ml.). The mixture is stirred for 12 hours and then diluted with water. The solid precipitate is collected, thoroughly washed with water, dried and crystallized from benzene to yield the title product with M.P. 141–144° C. The compound is also characterized by its oxalate salt, M.P. 151–153° C. after crystallization from methanol.

We claim:
1. A compound selected from the group which consists of compounds of the formula

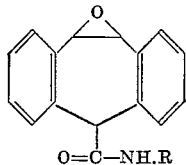

wherein R is selected from the group consisting of hydrogen, lower alkyl, di-loweralkylaminoethyl and di-loweralkylaminopropyl; and acid addition salts of said compounds wherein R in said formula represents a di-loweralkylaminoethyl and di-loweralkylaminopropyl with a pharmacologically acceptable acid selected from the group which consists of oxalic acid, tartaric acid and citric acid.

2. 10,11 - epoxy - 10,11 - dihydro - 5H - dibenzo[a,d]cycloheptene-5-carboxamide, as claimed in claim 1.

3. N - methyl - 10,11 - epoxy - 10,11 - dihydro - 5H - dibenzo[a,d]cycloheptene - 5 - carboxamide, as claimed in claim 1.

4. N - (dimethylaminoethyl) - 10,11 - epoxy - 10,11 - dihydro - 5H - dibenzo[a,d]cycloheptene - 5 - carboxamide as claimed in claim 1.

5. N - (dimethylaminopropyl) - 10,11 - epoxy - 10,11-dihydro - 5H - dibenzo[a,d]cycloheptene-5-carboxamide, as claimed in claim 1.

6. The oxalate salt of N(dimethylaminopropyl)-10,11-epoxy - 10,11 - dihydro - 5H - dibenzo[a,d]cycloheptene-5-carboxamide, as claimed in claim 1.

References Cited

J. of Medicinal Chemistry: vol. 7, 1964, pp. 88–94, "Anticonvulsants . . ." by Davis et al.

HENRY R. JILES, *Primary Examiner.*

S. WINTERS, *Assistant Examiner.*

U.S. Cl. X.R.

167—58, 64, 65